United States Patent [19]

Robinson et al.

[11] Patent Number: 4,655,890
[45] Date of Patent: Apr. 7, 1987

[54] LASER ISOTOPE SEPARATION BY MULTIPLE PHOTON ABSORPTION

[75] Inventors: C. Paul Robinson; Stephen D. Rockwood; Reed J. Jensen; John L. Lyman; Jack P. Aldridge, III, all of Los Alamos, N. Mex.

[73] Assignee: The United States of America as represented by the United States Department of Energy, Washington, D.C.

[21] Appl. No.: 699,237

[22] Filed: Feb. 8, 1985

Related U.S. Application Data

[63] Continuation of Ser. No. 354,417, Mar. 3, 1982, abandoned, which is a continuation of Ser. No. 913,635, Jun. 8, 1978, abandoned, which is a continuation of Ser. No. 810,545, Jun. 27, 1977, abandoned, which is a continuation of Ser. No. 570,924, Apr. 22, 1975, Pat. No. 4,049,515.

[51] Int. Cl.$^4$ .............................................. B01D 59/34
[52] U.S. Cl. ........................... 204/157.22; 204/157.21
[58] Field of Search ........... 204/157.22, 157.2, 157.21; 423/2

[56] References Cited

U.S. PATENT DOCUMENTS

| | | | |
|---|---|---|---|
| 3,937,956 | 2/1976 | Lyon | 250/290 |
| 3,944,825 | 3/1976 | Levy et al. | 204/157.22 X |
| 3,951,768 | 4/1976 | Gürs | 204/157.22 |
| 4,049,515 | 9/1977 | Robinson et al. | 204/157.22 |
| 4,082,633 | 4/1978 | Eerkens | 204/157.22 |

Primary Examiner—John F. Terapane
Assistant Examiner—Virginia B. Caress
Attorney, Agent, or Firm—Samuel M. Freund; Edward C. Walterscheid; Judson R. Hightower

[57] ABSTRACT

Multiple photon absorption from an intense beam of infrared laser light may be used to induce selective chemical reactions in molecular species which result in isotope separation or enrichment. The molecular species must have a sufficient density of vibrational states in its vibrational manifold that, is the presence of sufficiently intense infrared laser light tuned to selectively excite only those molecules containing a particular isotope, multiple photon absorption can occur. By this technique, for example, intense $CO_2$ laser light may be used to highly enrich $^{34}S$ in natural $SF_6$ and $^{11}B$ in natural $BCl_3$.

5 Claims, 8 Drawing Figures

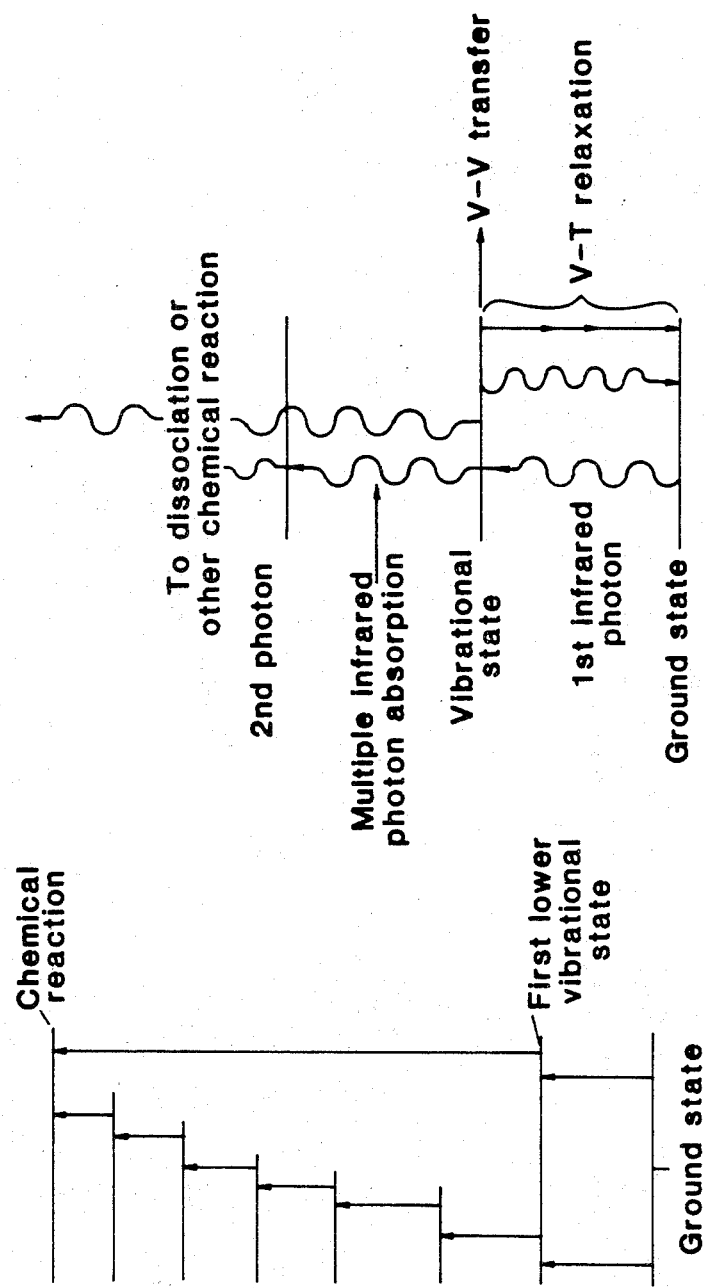

LASER ISOTOPE SEPARATION BY MULTIPLE PHOTON ABSORPTION

This invention is the result of a contract with the Department of Energy (Contract No. W-7405-ENG-36).

CROSS REFERENCE TO RELATED APPLICATIONS

This application is a continuation of application Ser. No. 354,417 filed Mar. 3, 1982, now abandoned, which is a continuation of application Ser. No. 913,635 filed June 8, 1978 now abandoned which in turn is a continuation of application Ser. No. 810,545 filed June 27, 1977 now abandoned, which in turn is a continuation of application Ser. No. 570,924 filed Apr. 22, 1975 now U.S. Pat. No. 4,049,515.

BACKGROUND OF THE INVENTION

This invention relates to methods of isotope separation and enrichment and more particularly to methods of isotope enrichment wherein molecular species containing a particular isotope are selectively excited by infrared laser light sufficiently to undergo chemical reactions whereas unexcited molecules of the species do not.

The present invention is related to the invention disclosed and claimed in the applicants' previously filed U.S. patent application Ser. No. 570,924, entitled "Laser Isotope Separation by Multiple Photon Absorption," now U.S. Pat. No. 4,049,515. The invention described therein includes the selective multiple photon absorption by molecular species of a single wavelength of laser radiation with subsequent chemical reaction of the resulting excited species. This patent application is a continuation of application Ser. No. 354,417 filed Mar. 3, 1982, now abandoned, which was a continuation of application Ser. No. 913,635 filed June 8, 1978, also abandoned.

It is known in the art that lasers may be used to selectively induce chemical reactions which effectively result in isotope separation or enrichment; see, e.g., N. V. Karlov, "Laser-Induced Chemical Reactions," Applied Optics, vol. 13, p. 301 (1974). A preferred approach has been two-step irradiation by two lasers of differing wavelength. The first laser, which is usually indicated to be an infrared laser, is used to selectively excite those molecules of a compound containing a particular isotope of an element. The second laser, which is usually indicated to be an ultraviolet laser, is used to further excite these molecules sufficiently for them to undergo a chemical reaction. As a practical matter, it is difficult to make the second laser as selective in its action as is the first laser so that it tends to excite all molecules of the compound containing the element of interest. Accordingly, for isotope separation or enrichment, a rather severe constraint placed on this second laser is that it be of a wavelength such that the combined excitation produced by it and the first laser is sufficient to induce chemical reaction, but the excitation produced by it alone will not induce chemical reaction. Heretofore the art has not taught that the first infrared laser, even if sufficiently intense, permits any more freedom of choice of the photon energy of the second laser, than the photon energy of the infrared laser. It certainly has not taught that if the infrared laser is sufficiently powerful it may readily eliminate any need for the second laser at all.

It is known that through use of single-photon absorption leading to photodissociation, selective or preferential laser-induced chemical reaction useful for isotope separation or enrichment may be achieved. The art teaches that for this single-photon technique, lasers operating in the visible or the ultraviolet are required.

A major disadvantage of the use of visible or ultraviolet lasers in the single photon or two-step process is that the cross sections for direct, single photon absorption of light in these regions of the spectrum are quite small. In addition, it is quite difficult to achieve high laser power operation with any efficiency in these regions of the spectrum.

SUMMARY OF THE INVENTION

Our invention avoids or substantially overcomes the foregoing disadvantages of the prior art laser isotope separation methods. In its broad aspect, our invention encompasses a method of obtaining elemental values enriched in a particular isotope of an element which comprises the following steps. A fluid is obtained which comprises a first molecular species containing two or more isotopes of the element. This first molecular species has, in the presence of sufficiently intense laser light, a density of vibrational levels sufficient to allow multiple photon absorption to higher vibrational levels from a first lower vibrational level by absorption of the same energy as can excite this first molecular species to this first lower vibrational level. This fluid is irradiated with infrared laser light of a frequency which selectively excites to a first lower vibrational level only those molecules of this first molecular species containing a particular isotope of the element. This infrared laser light has an intensity sufficient to produce multiple photon absorption from the first lower vibrational level to a plurality of higher vibrational levels. The resulting multiple photon absorption produces a sufficiently energetic vibrational state in those molecules containing the particular isotope that on irradiation by laser light of a second frequency they undergo chemical reaction. For isotope separation, the products of this chemical reaction are then separated from the unreacted molecules of the first molecular species.

In summary, the method of the present invention includes irradiating a mixture of molecules containing the element for which isotope separation is to be performed, and a scavenger species of fewer than five times the number of the molecules containing the element, with a first wavelength of infrared laser radiation which lies in close coincidence with the transition from the ground rotation-vibration level of the molecules containing one isotopic variant of the element and the next highest rotation-vibration level thereof having vibrational excitation, the first wavelength of infrared laser radiation having an intensity sufficient to induce multiple photon absorption thereof by the molecules containing the one isotopic variant of the element, whereby selective excitation to higher rotation-vibration levels occurs in these molecules; simultaneously irradiating the molecules containing the elements for which isotope separation is to be performed with a second wavelength of infrared laser radiation having an intensity sufficient to further excite the already excited molecules bearing the one isotopic variant to sufficiently high rotation-vibration levels of their ground electronic state by the selective absorption by these molecules of at least one photon of the second wavelength of infrared radiation, whereby the further excited molecules selectively undergo chemical reaction; and separating the reaction products of the chemical reaction from the unreacted molecules. Preferably, the chemical reaction is either dissociation of the vibrationally excited molecules or reaction of these molecules with a scavenger species. In the former case, a scavenger species may also be added in order to react with labile fragments produced in the dissociation process in order to avoid scrambling with molecules containing other isotopic variants of the element of interest. It is preferred that the molecules containing the element for which isotope separation is to be performed are in the gaseous state and that these molecules are polyatomic molecules having at least four atoms.

The fluid may be either liquid or gaseous but is preferably a gas. The first molecular species may be diatomic or polyatomic but is preferably a polyatomic of four or more atoms. The chemical reaction may be either reaction of the highly excited molecules of the first molecular species with a second molecular species, or dissociation of the excited molecules of the first molecular species, or reaction of at least one of the dissociation products of the excited first molecular species with a second molecular species. The second molecular species may be admixed with the first molecular species and the mixture irradiated. In this case, the second molecular species does not strongly adsorb the laser light and is substantially non-reactive with the unexcited first molecular species but highly reactive with either the highly excited molecules of the first molecular species or with at least one of the dissociation products of the excited molecules of the first molecular species.

In accordance with the method of the invention, $BCl_3$ is highly enriched is $^{10}B$ by irradiating a mixture of natural $BCl_3$ and hydrogen gas with an intense beam of pulsed $CO_2$ laser light. Likewise, $SF_6$ is highly enriched in $^{34}S$ by irradiating a mixture of natural $SF_6$ and hydrogen gas with an intense beam of pulsed $CO_2$ laser light.

BRIEF DESCRIPTION OF THE DRAWINGS

FIG. 3 is a schematic representation of multiple photon absorption resulting in selective chemical reaction in accordance with the method of the invention.

FIG. 4 is a schematic representation of a two-step process for producing selective chemical reaction in accordance with the method of the invention.

DETAILED DESCRIPTION OF THE PREFERRED EMBODIMENT

Figure 1:
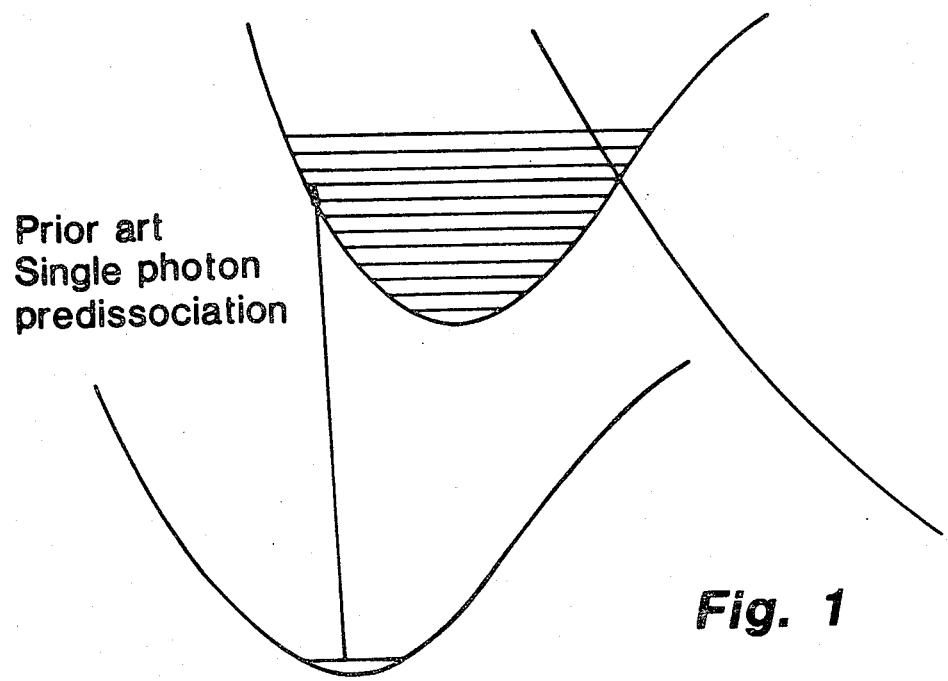
FIG. 1 is a schematic representation of selective single-photon photodissociation in accordance with the teaching of the prior art.

For every molecule, there is a minimum energy state called the ground state. Above this ground state are additional discrete energy states or levels. A molecule in the ground state or excited to a particular energy state may be excited to a higher energy state or level by absorption of radiation of the proper frequency. This change in energy state or level is called a transition. The probability of any transition occurring is given precisely by the Einstein relation:

$$p = BI(\nu)\sec^{-1}$$

where p is the transition probability, B is the Einstein coefficient and $I(\nu)$ is the radiation intensity. In accordance with quantum theory, molecular spectra show that the energy states of a molecule correspond to (a) different electronic orbits, (b) different internuclear distances and forces (c) rotations of some elements of the molecule with respect to other elements of the molecule, or (d) particular combinations of these. The optical spectrum of energy absorbed when the molecule is excited from one energy state to another may thus consist of (a) a vibrational spectrum, (b) a rotational spectrum, or (c) a compound spectrum, e.g., a vibrational-rotational spectrum or a vibrational-electronic spectrum. The combination of energy states is frequently called a manifold. Thus, for example, the vibrational spectrum results from the vibrational manifold.

For a polyatomic molecule no pure electronic absorption spectrum is possible. The reason for this is that in a given electronic state a polyatomic molecule must occupy a particular vibrational level. Each of the possible levels may be called a vibrational-electronic state or, as it has come to be known in the art, a vibronic state. Transitions from one vibronic state to a higher vibronic state result in a compound vibrational-electronic absorption spectrum.

In molecules containing different isotopes, the classical vibration frequencies differ according to $$|\Delta \nu| = \frac{1}{2} \cdot \frac{\Delta \mu}{\mu} \nu$$

where $\nu$ is the vibration frequency, and $\mu$ is the reduced mass of the molecule. The reduced isotopic mass difference $\Delta \mu$ is nonzero only if the isotopic atoms are in motion during the vibration. The resultant difference in frequency, $\Delta \nu$, is called the isotope shift. The isotope shift causes the absorption spectrum of molecules containing one isotopic species of an element to be somewhat shifted from that of molecules containing another isotopic species of that element. It is readily shown by quantum mechanical arguments that a similar isotopic shift in frequency occurs with vibronic transitions. If the shift in the absorption spectrum is such that narrow nonover-lapping absorption lines exist for molecules containing different isotopic species, then light of the proper frequency will be absorbed only by and excite only molecules containing a particular isotopic species.

Laser isotope separation is possible because the frequency purity of laser light is sufficient to be resonantly absorbed by one isotopic species without affecting other nonresonant isotopes. That is to say, the laser lines are sufficiently narrow to effect absorption by an optical absorption state of one isotope only. This absorption by only one isotope is termed selective excitation.

Figure 2:
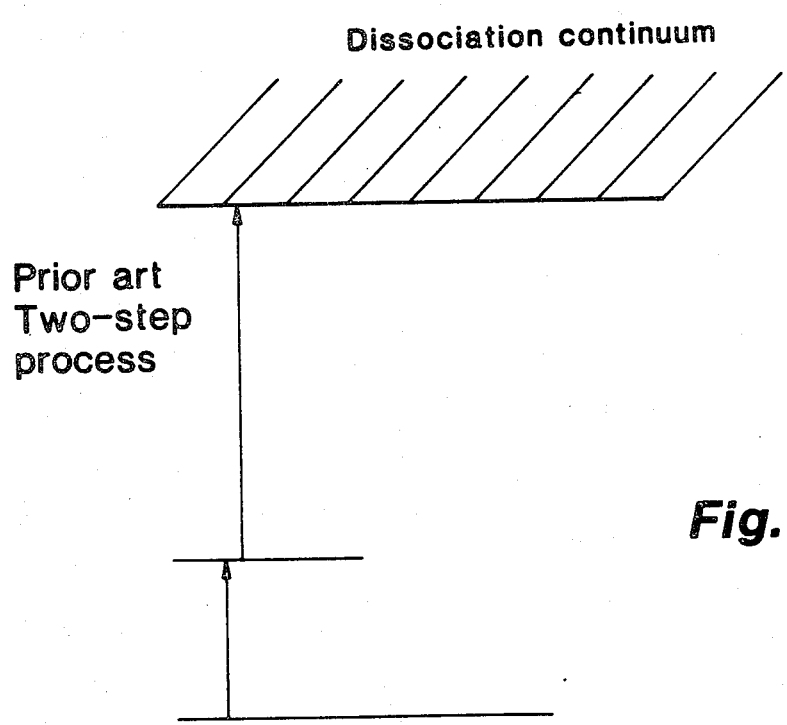
FIG. 2 is a schematic representation of a two-step process for producing selective chemical reaction in accordance with the teaching of the prior art.

As shown in FIGS. 1 and 2, the prior art teaches that this selective excitation may be used in either single step or two step processes for isotope separation by laser-induced chemical reaction. In the one-step process shown in FIG. 1, a single photon from a laser operating in the ultraviolet or the visible is sufficiently energetic to produce photodissociation in any molecule which it selectively excites. In the two-step process shown in FIG. 2, laser light of a first frequency selectively excites molecules containing a particular isotope and laser light of a second frequency then imparts sufficient additional excitation to the molecules excited by the light of the first frequency sufficient to cause only them to undergo chemical reaction. Although FIGS. 1 and 2 show only vibrational excitation, the same considerations apply where electronic states are concerned.

MULTIPLE PHOTON ABSORPTION

The method of the present invention is predicated on the discovery that infrared laser radiation of sufficient intensity which is of a frequency which selectively excites only molecules containing a particular isotope may readily produce multiple photon absorption in molecules having a sufficient density of vibrational levels or states. In accordance with the invention, the multiple photon absorption may be used to produce (a) an excited vibrational state in the excited molecules at which chemical reaction occurs as shown in FIG. 3, or (b) an excited vibrational state at which a more advantageous frequency of a second laser may be used to produce selective chemical reaction in accordance with the two step process shown in FIG. 4. By chemical reaction is meant either dissociation of the highly excited molecules or reaction with another chemical species.

Multiple photon absorption results in a final state of the system possessing more energy than that of a single incident photon. The phrase "multiple photon absorption" denotes both sequential absorption of n-photons where the system passes through real intermediate states and n-photon processes where n-photons are absorbed simultaneously and the system may only pass through virtual intermediate states.

In the vibrational manifold, the spacing between vibrational levels changes as transition to higher vibrational levels occurs. Accordingly, although it was understood that isotopically selective excitation could readily be made to occur between the ground state and a lower vibrational state by absorption of an infrared photon of the proper energy, no consideration had heretofore been given to the possibility of additional absorptions, of photons of this same energy, thereby transporting the molecule up the vibrational manifold to chemical reaction. The reason for that is that because of the change in the spacing of the vibrational levels, there was thought to be little likelihood that transitions to higher excited states would match the energy of those photons capable of producing the initial transition from the ground state.

The exact mechanism by which multiple photon absorption occurs is complex and not yet fully understood. However, it is known that due to anharmonic effects and the increased number of atoms in polyatomic molecules, the density of vibrational states is greatly increased so that the probability of matching the infrared photon energy with transitions between excited states is greatly increased. In addition, when the infrared laser radiation is sufficiently intense, i.e., has a sufficiently high power density, the electric field associated with this power density serves to further increase the probability of matching transitions between excited states through the process of optical frequency Stark broadening. Further enhancement of the multiple photon absorption is through the mechanism of resonantly enhanced multiphoton transitions in which there is no detectable lifetime of the molecule in the intermediate states. Finally the selection rules for multiple quantum absorptions are relaxed at high vibrational energies in some molecules.

To minimize collisional scrambling effects, it is essential that the molecular species being irradiated be present in a dilute fluid. It is preferred that the molecular species be present as a gas.

In one embodiment of the invention, multiple photon absorption of infrared photons results in an excited state at which the selectively excited molecules undergo chemical reaction with a second chemical species present in admixture with these molecules. In another embodiment, the multiple photon absorption results in a dissociation of the selectively excited molecules. In a third embodiment, the multiple photon absorption results in dissociation of the selectively excited molecules with at least one of the dissociation products undergoing rapid chemical reaction with a second chemical species present in the irradiated fluid. It will be readily understood by one of ordinary skill in the art that if a second chemical species is admixed with the first molecular species for the purpose of reacting with either highly excited molecules or dissociation products of the first molecular species, the second chemical species must not absorb the infrared laser radiation to any substantial degree and must be substantially inert to unexcited molecules of the first molecular species but highly reactive with highly excited molecules of this species or with at least one of the dissociation products of this species.

The method of the invention may be practiced with any infrared laser of sufficient power that has a frequency which permits selective excitation of a molecular species containing a particular isotope desired to be acted upon. The $CO_2$ laser is particularly well suited for use with the method of this invention is that there are $CO_2$ lines which coincide with spectral features of the volatile halides of many elements. Examples of such halides include $SF_6$, $SiF_4$, $CH_3F$, $BCl_3$, $NF_3$, and $CF_2Cl_2$. Because hydrogen reacts rapidly with atomic halogens, $CO_2$ laser irradiation of admixtures of such volatile halides with hydrogen is a particularly advantageous way to produce selective chemical reaction in the method of the invention.

DESCRIPTION OF THE PREFERRED EMBODIMENT

Example I

Mixtures of $SF_6$ and $H_2$ with a constant $SF_6$ mole fraction of 0.1 were irradiated with focused $CO_2$ laser radiation. The $CO_2$ laser was a conventional double discharge design delivering a multimode output of 1 to 2 joules in a 200 ns gain switched pulse. The radiation was focused with f/1.5 Ge and $BaF_2$ lenses into sample cells containing the $SF_6/N_2$ mixture at total pressures varied from 1 to 10 torr. The peak laser power at focus was estimated at $\xi 6 \times 10^9$ watts/cm$^2$. The sample cells were brass right circular cylinders 7.62 cm long with an i.d. of 2.54 cm fitted with KCl windows giving a total gas volume of 38.6 cc. The sample cell length and lens f number are dictated by the damage threshold of the KCl windows.

Following irradiation by a specified number of laser pulses the residual $SF_6$ were analyzed by scanning mass peaks 127 and 129 with a quadrupole mass spectrometer. These masses correspond to the $^{32}S$ and $^{34}S$ isotopes in the dominant ion $SF_5^+$ produced in the mass spectrometer. Analysis of the spectrum is simplified by the presence of only one stable F isotope and a separation of two mass units between the desired peaks thus eliminating possible confusion due to H atom attachment to the ions of interest. Scans of uninterrupted $SF_6/H_2$ mixtures yielded a normal ratio of $^{34}S/^{32}S \equiv R_o = 0.044 \pm 0.002$.

Figure 5:
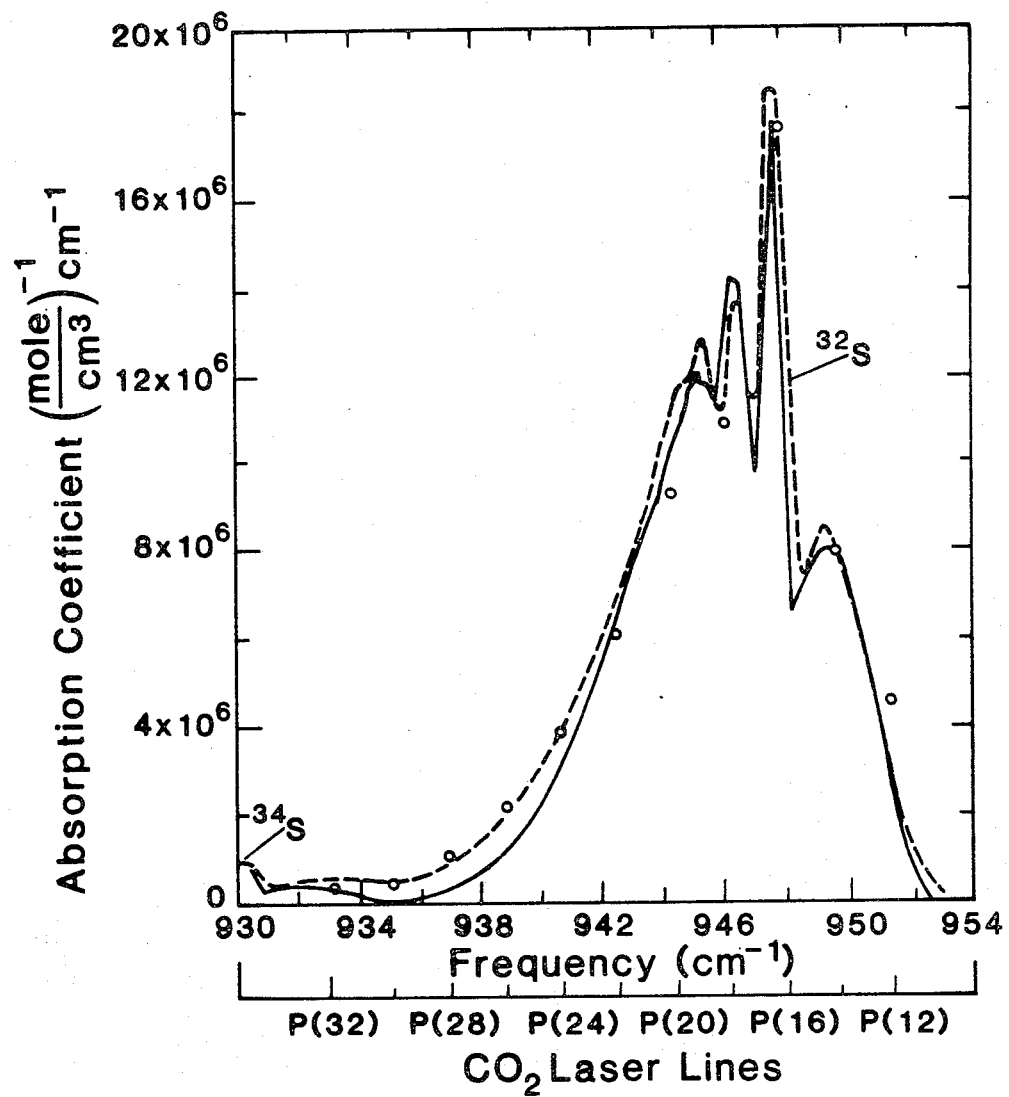
FIG. 5 shows the infrared absorption spectrum of $SF_6$ at 300K and matching $CO_2$ lines.

Table I lists the enrichment factor $\beta = R/R_o$ of the unreacted $SF_6$ as a function of the number of irradiation events, gas pressure, fraction reacted and laser wavelength. The quantity R is defined as the measured $^{34}S/^{32}S$ ratio following irradiation. FIG. 5 shows the infrared absorption spectrum of $SF_6$ at 300K and the position of various $CO_2$ laser lines relative to that spectrum. In FIG. 5, the solid curve is the prediction of a band contour model using a 0.5 cm$^{-1}$ spectral window; the dashed curve is the spectrum of a $SF_6$-AR mix $(X(SF_6) = 0.005)$ obtained on a Beckman IR-20AX spectrometer with a 0.8 cm$^{-1}$ spectral window; and the solid circles show spectral results obtained with a $CO_2$ laser. The rationale for choosing the various $CO_2$ lines was based upon recent examination of the temperature dependence of absorption of $CO_2$ laser lines by $SF_6$. This work indicated that the P(20) and P(32) lines are absorbed primarily in hot bands thus they should greatly enhance the vibrational energy of the absorbing molecules. On the other hand, very high resolution spectroscopy of cooled $SF_6$ reveals that the P(16) line is coincident with the ground state $v_3$ Q-branch. Thus it falls in a region where the density of states is very high. It was felt that the variations of $\beta$ among the selected lines might be indicative of the enrichment mechanism. However, from the results in Table I the variation with wavelength is not great and may simply be the result of line-to-line variations in laser output.

indicative of a collisional process (most probably V—V transfer in $SF_6$) inducing scrambling of the isotopically selective excitation. Phenomenologically one observes that $\beta$ is proportional to exp (1/p). Scrambling may also be induced by chemical reactions of highly excited $SF_6$ produced just outside the region where the power exceeds the multiple photon absorption threshold.

In this example, the method of the invention produces better than a factor of 33 increase in the ratio of $^{34}S/^{32}S$ in $SF_6$ that has been irradiated in the presence of $H_2$ by an intensely focused $CO_2$ laser. The mechanism of enrichment appears to be a multiple photon dissociation of $^{32}SF_6$ with the liberated F being scavenged by $H_2$ to form HF.

From the data in Table I the threshold power required to produce enrichment appears to be greater than 5 MW/cm$^2$. A peak power of 200 MW/cm$^2$ does produce some enrichment but is not nearly as efficient as the 6 GW/cm$^2$ pulses.

Example II

Mixtures of natural $BCl_3$ and hydrogen were irradiated with focused $CO_2$ laser radiation from a $CO_2$ laser operating on the P(20) line using the same setup as described in Example I for $SF_6$ irradiation. For some irradiations the admixture consisted of 20% $BCl_3$ and for others 40% $BCl_3$ with the remainder hydrogen. Natural $BCl_3$ contains 80% $^{11}B$ and 20% $^{10}B$. It also contains 75% $^{35}Cl$ and 25% $^{37}Cl$. Thus mass spectrometric analysis of natural $BCl_3$ reveals the following mass peaks corresponding to the indicated isotopic ratio.

| Mass Peak | Isotopic Species |
|---|---|
| 115 | $^{10}B^{35}Cl_3$ |
| 116 | $^{11}B^{35}Cl_3$ |
| 117 | $^{10}B^{35}Cl_2^{37}Cl$ |
| 118 | $^{11}B^{35}Cl_2^{37}Cl$ |
| 119 | $^{10}B^{37}Cl_2^{35}Cl$ |
| 120 | $^{11}B^{37}Cl_2^{35}Cl$ |
| 121 | $^{10}B^{37}Cl_3$ |
| 122 | $^{11}B^{37}Cl_3$ |

TABLE I

| $CO_2$ F(16) Line[a] | | | | | $CO_2$ F(20) Line | | | | | $CO_2$ F(32) Line | | | | |
|---|---|---|---|---|---|---|---|---|---|---|---|---|---|---|
| Press. (torr) | Shots | $SF_6$ Reacted[b] (%) | R | $\beta$ | Press. (torr) | Shots | $SF_6$ Reacted (%) | R | $\beta$ | Press. (torr) | Shots | $SF_6$ Reacted (%) | R | $\beta$ |
| 5 | 3000 | 72 | 0.09 | 2.0 | 10 | 2000 | 50 | 0.062 | 1.44 | 5 | 1600 | 85 | 0.071 | 1.50 |
| 3 | 4000 | — | 0.10 | 4.0 | 5 | 2000 | 73 | 0.078 | 1.73 | 5 | 4000 | 86 | 0.095 | 2.11 |
| 1 | 2400[c] | 45 | 0.056 | 1.24 | 5 | 3200 | 71 | 0.082 | 1.82 | | | | | |
| 1 | 4800 | 98 | 0.84 | 18.7 | 5 | 4800 | — | 0.21 | 4.7 | | | | | |
| | | | | | 2 | 1600 | 72 | 0.097 | 2.2 | | | | | |
| | | | | | 2 | 1600[d] | 0 | 0.045 | 1.00 | | | | | |
| | | | | | 1 | 2000 | 97 | 0.54 | 12.0 | | | | | |
| | | | | | 1 | 5000 | 99.7 | 1.50 | 33.3 | | | | | |

[a]Unless otherwise noted peak laser power was 6 CM/cm$^2$.
[b]Error bars on this quantity are large. Approximately 30% of unreacted fraction.
[c]Peak power for these pulses was only 0.5 CM/cm$^2$.
[d]Peak power for these pulses was only 5 MM/cm$^2$.

Figure 6:
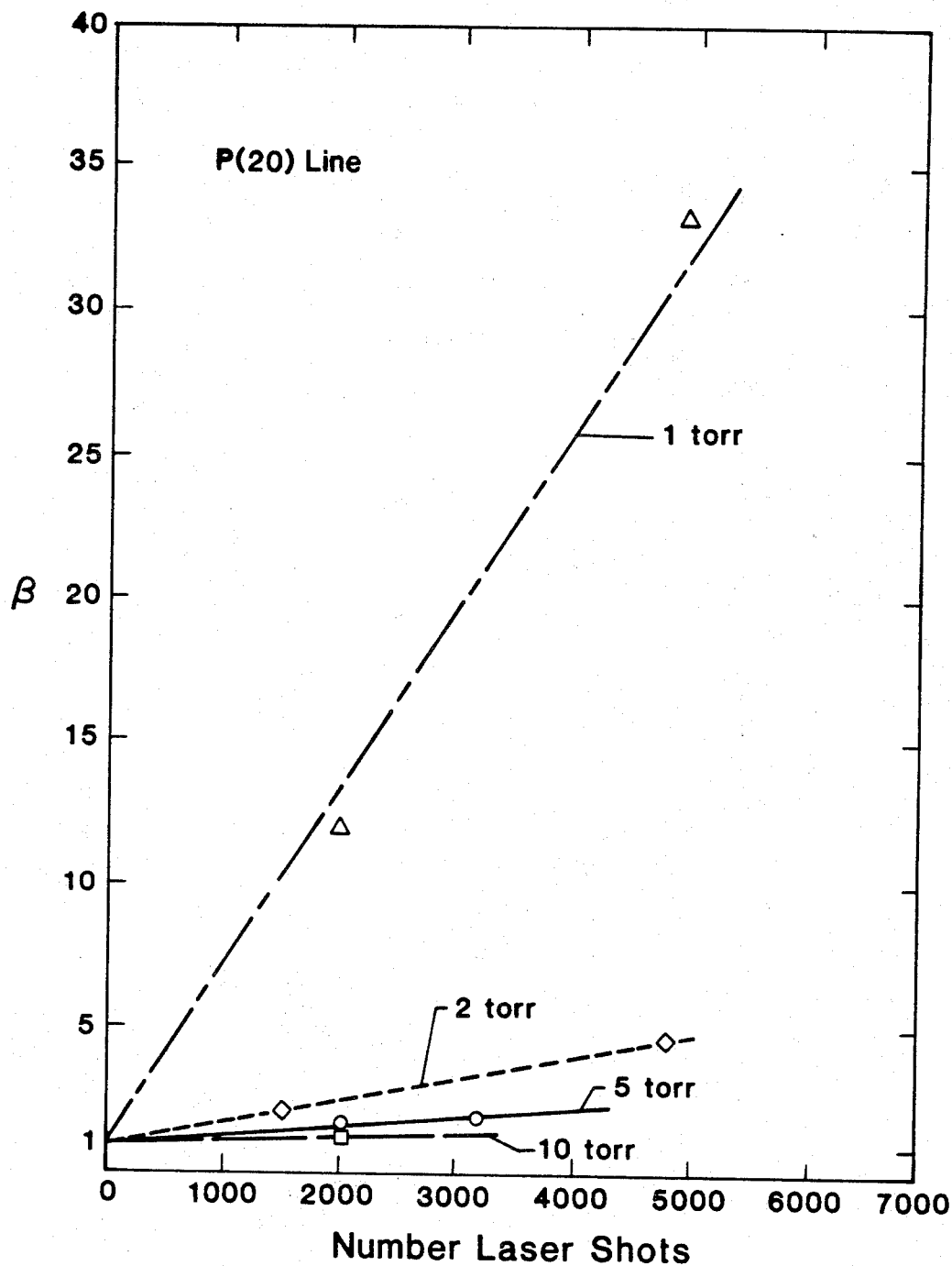
FIG. 6 shows the enrichment factor $\beta$ for $^{34}S$ as a function of the number of $CO_2P(20)$ laser irradiation events parametric in gas pressure.

FIG. 6 displays $\beta$ as a function of laser pulses parametric in gas pressure. There is a near linear increase in $\beta$ with the number of laser pulses. In addition the fractional increase in $\beta$ per radiative event in approximately equal to the ratio of focal volume to total cell volume.

Figure 7:
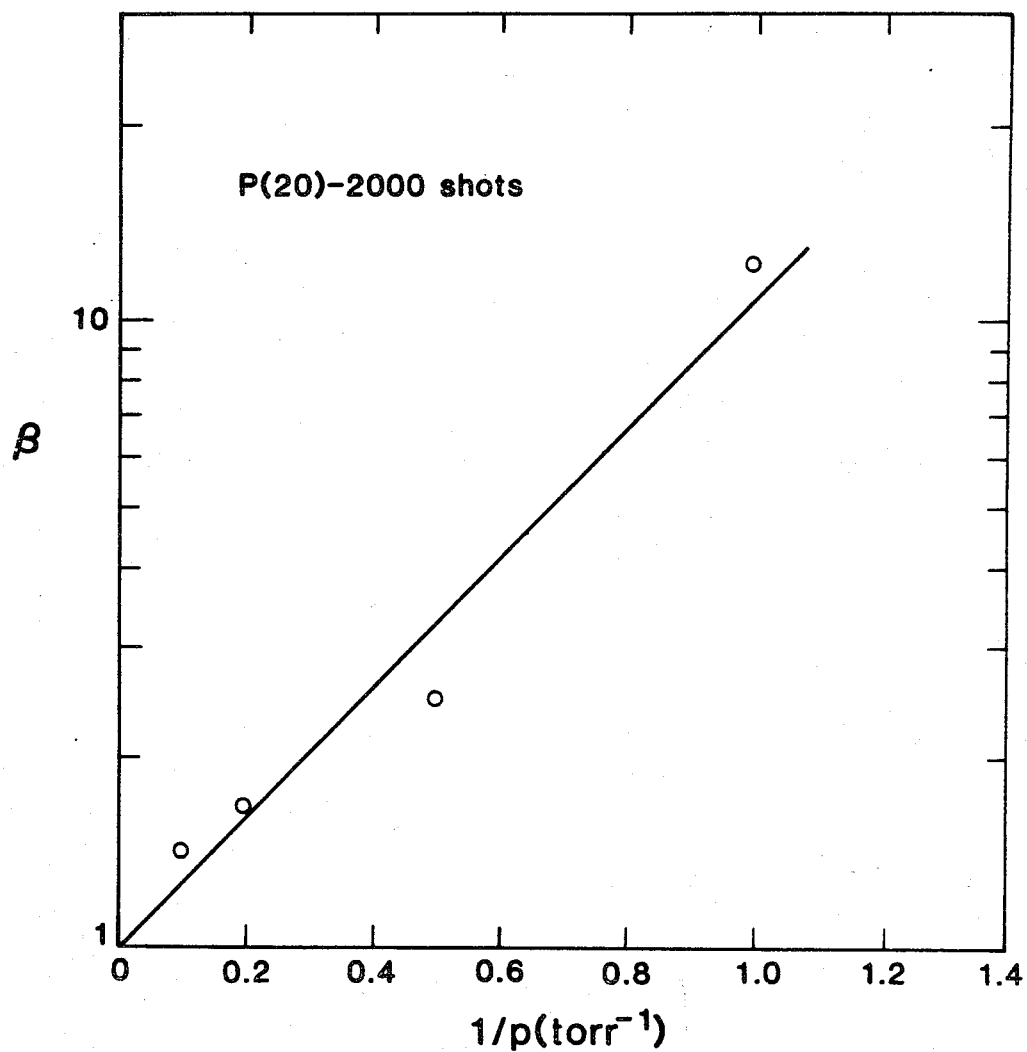
FIG. 7 shows the enrichment factor $\beta$ for $^{34}S$ after 200 shots of $CO_2P(20)$ radiation plotted as a function of the reciprocal of the total gas pressure p.
Figure 8:
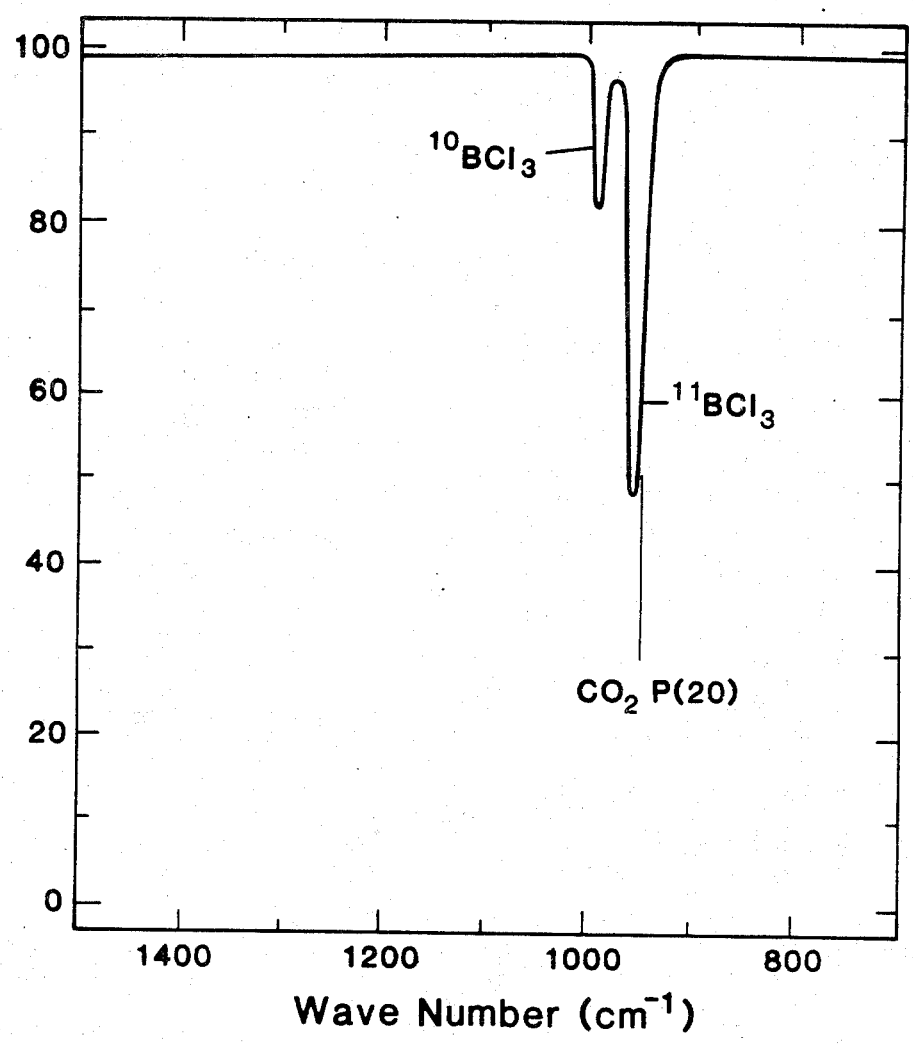
FIG. 8 shows the infrared absorption spectra of $BCl_3$ at 300K and matching $CO_2$ lines.

The greatest improvement in enrichment is achieved by reducing the total gas pressure as shown in FIG. 7. This effect is partially accounted for by the greater extent of reaction at low pressure (Table I). It is also Total pressures of the hydrogen—$BCl_3$ mixture were varied from 1.5 to 5 torr for each mixture, where the pressure was greater than 3 torr, little or no chemical reaction occurred. At pressures of 3 torr or less, however, mass peaks 115, 117, 119, 120, 121, and 122 are removed after 1000 pulses and the residual remaining $BCl_3$ contains 70% $^{11}B^{35}Cl_3$ and 30% $^{11}B^{35}Cl_2^{37}Cl$. Further, the isotopic combinations which are removed were shown to be a function of gas pressure and gas temperature. That is to say, by a proper choice of these parameters, the $CO_2$ radiation will provide selective synthesis of isotopic compounds. Thus selective enrichment as separation of desired boron and/or chlorine isotopes may be achieved in accordance with the method of this example.

The various features and advantages of the invention are thought to be clear from the foregoing description. However, various other features and advantages not specifically enumerated will undoubtedly occur to those versed in the art, as likewise will many variations and modifications of the preferred embodiment, illustrated, all of which may be achieved without departing from the spirit and scope of the invention as defined in the following claims.

What we claim is:

1. A method for separating isotopes of an element, said method comprising the steps of:
    a. irradiating a mixture of molecules containing the element, and a scavenger species of fewer than five times the number of said molecules containing the element, with a first infrared laser radiation having a first wavelength which lies in close coincidence with the transition from the ground rotation-vibrational level of those of said molecules which contain the isotopic variant of the element which is to be separated and the next highest rotation-vibration level having vibrational excitation, said first infrared laser radiation having an intensity sufficient to selectively induce multiple photon absorption of said first wavelength laser radiation by those of said molecules which contain the isotopic variant of the element which is to be separated;
    b. simultaneously irradiating said molecules containing the element with a second infrared laser radiation having a second wavelength chosen to selectively excite said molecules which have selectively absorbed said first electromagnetic radiation by the absorption of at least one photon of said second wavelength laser radiation, whereby said molecules which have selectively absorbed said first wavelength laser radiation are excited to sufficiently high rotation-vibration levels of the ground electronic state such that said selectively excited molecules undergo chemical reaction while molecules containing other isotopic variants of the element remain substantially in their lower rotation-vibration levels and consequently substantially unreactive; and
    c. separating the product of said chemical reaction of said selectively excited molecules from said unreacted molecules.

2. The method as described in claim 1, wherein said chemical reaction include photodissociation.

3. The method as described in claim 1, wherein said chemical reaction includes reaction of said vibrationally excited molecules with said scavenger species.

4. The method as described in claim 2, wherein the products of said photodissociation are reacted with said scavenger species before said step of separation of said products of said chemical reaction from said unreacted molecules.

5. The method as described in claim 4, wherein said molecules containing the element for which isotope separation is to be performed are in the gaseous state and wherein said molecules containing the element for which isotope separation is to be performed have at least four atoms.

* * * * *